United States Patent

Taylor et al.

[11] Patent Number: 5,879,774
[45] Date of Patent: Mar. 9, 1999

[54] MULTILAYER LAMINATE ELEMENTS HAVING AN ADHESIVE LAYER

[75] Inventors: Jeffrey F. Taylor, Fairport, N.Y.; Douglas H. Pulsifer, Normal, Ill.

[73] Assignee: Eastman Kodak Company, Rochester, N.Y.

[21] Appl. No.: 984,548

[22] Filed: Dec. 3, 1997

[51] Int. Cl.$^6$ .................................................. B32B 3/00
[52] U.S. Cl. .................. 428/64.1; 428/64.4; 428/65.2; 428/474.7; 428/520; 428/913; 430/270.11; 430/495.1; 430/945; 369/283; 369/288
[58] Field of Search ................... 428/64.1, 64.2, 428/64.4, 65.2, 474.7, 518, 520, 913; 430/270.11, 495.1, 945; 369/283, 288

[56] References Cited

U.S. PATENT DOCUMENTS

| | | | |
|---|---|---|---|
| 4,751,124 | 6/1988 | Matsuzawa et al. | 428/64.1 |
| 4,933,234 | 6/1990 | Kobe et al. | 428/336 |
| 4,956,214 | 9/1990 | Imataki et al. | 428/64.1 |
| 4,960,680 | 10/1990 | Pan et al. | 430/346 |
| 4,990,208 | 2/1991 | Kano | 156/291 |
| 5,167,996 | 12/1992 | Kurisu et al. | 428/64.1 |
| 5,503,889 | 4/1996 | Imataki | 428/64.1 |
| 5,585,158 | 12/1996 | Raychaudhuri et al. | 428/64.1 |

FOREIGN PATENT DOCUMENTS

| | | |
|---|---|---|
| 3628701 | 2/1988 | Germany . |
| 3207778 | 9/1991 | Japan . |

OTHER PUBLICATIONS

H. Mark et al., Encyclopedia of Polymer and Engineering, vol. 1, 1986 p. 229, John Wiley & Sons, NY.

H.W.Coover, et al., Handbook of Adhesivies 3rd Edition, 1990.

Primary Examiner—Elizabeth Evans
Attorney, Agent, or Firm—John R. Everett

[57] ABSTRACT

Multiple layer laminate element, such as DVD optical recording elements, are disclosed. The laminates include a cured cyanoacrylate adhesive layer in direct contact with a polymeric layer having a chemically bound cure accelerator for the cyanoacrylate.

14 Claims, 1 Drawing Sheet

MULTILAYER LAMINATE ELEMENTS HAVING AN ADHESIVE LAYER

FIELD OF THE INVENTION

The present invention relates multilayer laminate elements such as DVD optical recording elements.

BACKGROUND OF THE INVENTION

Optical recording elements for recording and storing digital information are known. One of the currently popular optical recording element is the compact disc or CD. CDs and recordable CDs (CD-Rs) have transformed the personal entertainment, personal computer and data storage industries. CDs and CD-Rs have made it possible to store enormous amounts of music or data on inexpensive, reliable, mass produced media.

Digital Versatile Disc (DVD) and recordable DVD (DVD-R) optical recording elements are being developed. These elements have significantly greater storage capacity than CDs.

In CDs and DVDs digital information is stored in the form of low reflective marks on an otherwise reflective background. In this format the optical information is in the form of read only memory or ROM. Optical information is not recorded in real time, but is produced by press molding. In a typical process a substrate is stamped with a master containing the digital information in an embossed form. The stamped substrate, beaing deformations caused by the embossed master, is coated with a reflective layer and then with a protective layer. In the stamped substrate areas having the deformations the reflectivity is lower than in undeformed areas.

Several different layer configuration embodiments are possible for DVD optical recording elements. Two embodiments are presented in FIGS. 1 and 2.

In the FIG. 1 embodiment the DVD element comprises the following layer arrangement:
 (a) a transparent substrate that may or may not include grooves for laser tracking;.(1)
 (b) an optical recording layer; (2)
 (c) a light reflecting layer (3).
 (d) a protective layer (4).
 (e) an adhesive layer (5).
 (f) a protective layer (6).
 (g) a reflective layer (7). and
 (h) a substrate (8).

In the embodiment presented in FIG. 1 one or more of layers (d), (f) and (g) may be omitted in some applications.

In the FIG. 2 embodiment the DVD element comprises the following layer arrangement:
 (a) a transparent substrate that may or may not include grooves for laser tracking (1);
 (b) an optical recording layer; (2)
 (c) a light reflecting layer (3).
 (d) a protective layer (4).
 (e) an adhesive layer (5).
 (f) a protective layer (6).
 (g) a reflective layer (7).
 (h) an optical recording layer; and
 (i) a transparent substrate that may or may not include grooves for laser tracking.

In some FIG. 2 embodiments one or both of the protective layers (d) and (f) may be omitted.

An important component in these multilayer laminate DVD elements is the adhesive layer. The adhesive must be effective in holding the various layers together in a single package in a variety of environments. In embodiments having two recording layers the adhesive layer must be optically clear at the read and write wavelengths. Rapid curing of the adhesive is desirable to avoid warping of the element.

SUMMARY OF THE INVENTION

The present invention provides a multilayer laminate element comprising a cured cyanoacrylate adhesive layer in direct contact with a polymeric layer having a chemically bound cure accelerator for the cyanoacrylate. This multilayer laminate element may be a DVD optical recording element.

This improved laminate further provides a DVD optical recording element having the following layer arrangement:
 (a) a transparent substrate;
 (b) an optical recording layer;
 (c) a light reflecting layer;
 (d) a polymeric protective layer of one or more vinyl monomers, including at least one vinyl monomer having incorporated therein a amine group that accelerates curing of cyanoacrylate adhesives.
 (e) a cured cyanoacrylate adhesive; and
 (f) a substrate.

The above DVD optical recording element is made with a method comprising the steps of:
 providing a first assembly comprising:
  (a) a transparent substrate;
  (b) an optical recording layer;
  (c) a light reflecting layer over the recording layer and
  (d) a protective layer over the light reflective layer; wherein the protective layer includes an accelerator that accelerates curing of cyanoacrylate adhesives;
 providing a second assembly comprising at least a substrate;
 forming a laminate of the first and second assembly by bonding, with a cyanoacrylate adhesive, the protective layer of the first assembly to (i) the substrate of the second assembly or (ii) another exposed layer of the second assembly.

The present invention provides a rapid cure method for laminates, such as DVD elements, formed with cyanoacrylate adhesives. This provides elements that are substanially unwarped. Accelerators generally used for cyanoacrylate adhesives are low molecular volatile molecules which do not spread over substrates easily. Such volatile accelerators can cause premature curing of the cyanoacrylates and unpleasant odors. The present invention avoids these problems by incorporating the accelerator chemically into the protective layer chemistry.

DETAILED DESCRIPTION OF THE INVENTION

Figure 1:
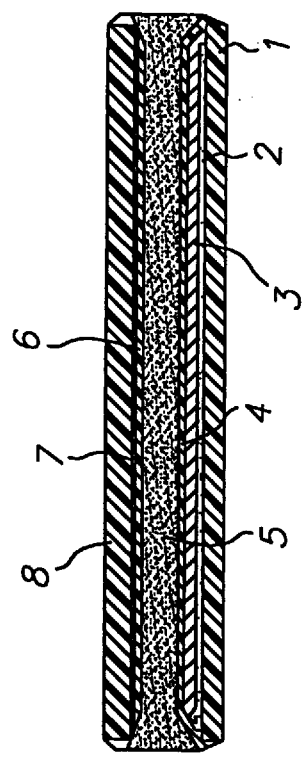
FIG. 1 presents a DVD optical recording element having a single optical recording layer.

Cyanoacrylate adhesives have a high cure rate in the presence of moisture in the air. In the presence of moisture, cure rates on the order of seconds is possible. However such cure rates are not achieved in making laminates such as DVD elements. This results from a lack of moisture at the center of DVD element. This results in slow cure rates.

This problem is overcome in the present invention through the use of an accelerator for the cyanoacrylate adhesive. The accelerator is material that accelerates the curing of cyanoacrylate adhesives in the absence of moisture. The accelerator could not be mixed directly with the adhesive during application of the adhesive to desired DVD layer. This would result in premature curing. Instead the accelerator is added to one or more layers adjacent to the intended adhesive layer manufacture of the DVD element. In this way the adhesive does not contact the accelerator until the final lamination is formed.

Typical adhesives are the 2-cyanoacrylic esters having the structure $CH_2=C(CN)(COOR)$ in which R represents —$CH_3$, $(CH_2)_nCH_3$ where n=1-3, —$OCH_2CH_2OCH_3$,— $OCH_2CH_2OCH_2CH_3$, —$CH(CH_3)_2$, and $CH(CH_2CH_3)(CH_3)$.

Typical cyanoacrylate adhesives include:

methyl 2-cyanoacrylate;
ethyl 2-cyanoacrylate;
isopropyl 2-cyanoacrylate;
butyl 2-cyanoacrylate;
isobutyl 2-cyanoacrylate;
methoxy ethyl 2-cyanoacrylate;
ethoxy ethyl 2-cyanoacrylate;

Other useful adhesives can be selected from "Cyanoacrylates Adhesives", page 469 (Chapter 27) *Handbook of Adhesives* 3rd Edition Van Nostrand Reinhold, N.Y., 1990).

The protective layers used herein contain one or more photopolymerizable vinyl monomers. Such monomers can, for the purposes of this case, contain one or more double bonds. One of such monomers contains an accelerator for cyanoacrylate adhesives. Non-accelerator monomers include 1,3-propanediol diacrylate, 1,3 butanediol diacrylate, 1,6-hexanediol diacrylate, 1,10-decanediol diacrylate, diethyleneglycol diacrylate, triethyleneglycol diacrylate, tetraethyleneglycol diacrylate, tripropyleneglycol diacrylate, polyethyleneglycol diacrylate, neopentylglycol diacrylate, hydroxypivalic acid ester, neopentylglycol diacrylate, trimethylolpropane diacrylate, bisoxyethylenized bisphenol A diacrylate, bisdi(oxyethylenized)bisphenol A diacrylate, bisoxypropylenized bisphenol A diacrylate, bisdi (oxypropylenized)bis-phenol A diacrylate, 3-methylpentanediol diacrylate, bisacryloyloxyethyloxymethyl tricyclodecane, and their corresponding dimethacrylates; triacrylates and trimethacrylates such as trimethylolpropane triacrylate, pentaerythritol triacrylate and their corresponding trimethacrylates, and tris(2-hydroxyethyl) isocyanate; acrylates and methacrylates having four or more reactive groups such as dipentaerythritol hexa-acrylate, tetramethylolmethane tetraacrylate and pentaerythritol tetraacrylate, and their corresponding methacrylates; and the like. Other well known crosslinking agents are included within the scope of the invention.

Vinyl monomers having amine accelerator groups are included in the protective layer to promoting curing of the cyanoaciylate. This includes a wide variety of materials such as those listed below:

2-(dimethylamino)ethyl acrylate

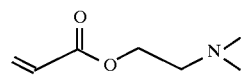

Dimethylamino Ethyl Methacrylate

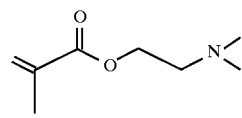

Diethylamino Ethyl Acrylate

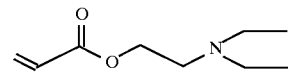

Tris-2-acryloyloxyl Ethyl Amine R=H

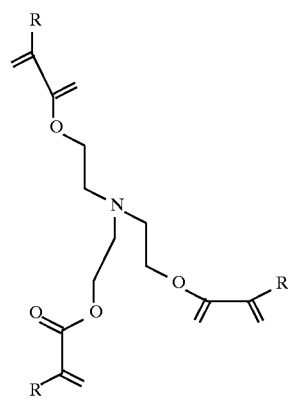

Tris-2-methacryloyloxyl Ethyl Amine R=$CH_3$ 2-methyl-2-(dimethylamino)-1-[(dimethylatino)methyl] ethyl methacrylate

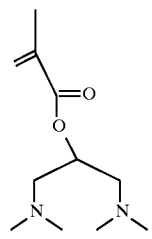

4-(N,N-dimethyl amino methyl)styrene

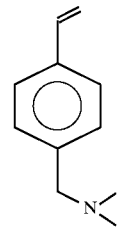

N-[3(dimethylamino)propyl]acrylamide

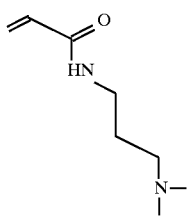

N-[2-(dimetlylamino]ethyl]aclylamide

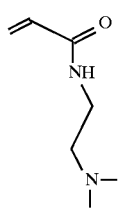

N-[2-(dimethylamino)ethyl]methacrylamide

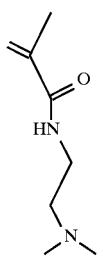

3-(diethylamino)propyl acrylate

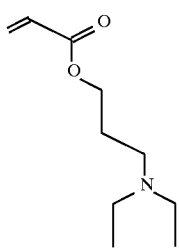

4-diethylamnino-1-methyl butyl acrylate

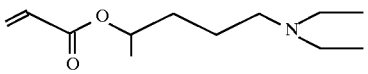

N-(t-butyl)amino ethyl methacrylate

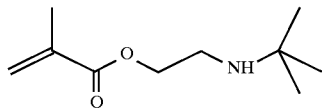

Di-n-butylamino ethyl acrylate

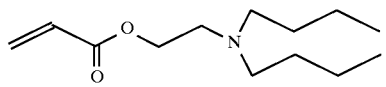

N-[2-(dimethylamino)propyl]methamide

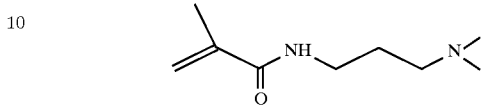

N-piperazine acrylamide

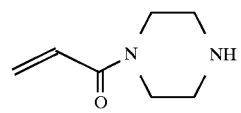

In general the protective layers are formed by combining all the vinyl monomers, including those having amine accelerator groups, and a polymerization photoiniatior. The combination is then spin coated on a substrate. In this invention the substrate is usually a reflective layer or a polycarbonate substrate. The coated layer is then exposed to actinic radiation. Polymerization photoiniatior for this type of compostion is well known in the art.

Oiptical Recording Elements

Broadly, the multilayer laminate optical elements provided by the invention comprise a light transmitting substrate, a recording layer overlaying the substrate, a light reflective layer overlaying the light absorptive layer, a protective layer overlaying the light reflective layer, an adhesive layer and a substrate.

The optical recording layers can be, but are not limited to, a dye layer of the type disclosed in U.S. Pat. Nos. 5,547,728; 5,529,471 and 5,604,004; a phase change layer of the type disclosed in U.S. Pat. No. 4,960,680 or a low adsorption material of the type disclosed U.S. Pat. No. 5,585,158. The following description focuses on DVD elements having dye recording layers. Those skilled in the art will easily adapt such description for use with other optical recording layers to form multilayer laminate DVD elements.

In embodiments involving dye recording layers of the type presented in the examples hereafter, at least one of the substrates is pregrooved. The recording process will produce marks of lower reflectivity than the unmarked areas of the disk when written and read with a diode laser emitting between 400 and 660 nm. The substituents on the dye molecules are selected such that the real part of the complex refractive index (n) of the unwritten recording layer measured with a light source having a selected wavelength from 400 to 660 nm is greater than 1.8 and the imaginary part (k) is less than 0.2.

In the examples mixtures of cyanine dyes and metallized carbamoylazo dyes stabilizers optical recording layers are used to provide optical recording layeres having the appropriate refractive indices. Cyanines dyes includes indolo-, thia-, and oxacarbocyanines well know in the optical recording element arts. Useful dyes and stabilizers are disclosed in commonly owned U.S. patent application Ser. No. 08/881,867 filed Jun. 25, 1997 in the name of Chapman et al.

Useful stabilizers are presented in Table 1.

TABLE 1

Metallized Azo Dyes

[Structure: Ni complex (bracketed, subscript 2) of a pyridinone-azo-benzamide ligand with substituents R, R₁, Y on the pyridinone ring, X on the phenyl ring, and R₂, R₃ on the carbamoyl nitrogen]

| Dye No. | R | R₁ | Y | X | R₂ | R₃ |
|---|---|---|---|---|---|---|
| 1 | $NH_2$ | H | H | H | $CH_2CH_3$ | $CH_2CH_3$ |
| 2 | $NH_2$ | H | H | H | $(CH_2)_2CH_3$ | $(CH_2)_2CH_3$ |
| 3 | $NH_2$ | H | H | H | $(CH_2CH_2)_2O$ | |
| 4 | $NH_2$ | $CH_3$ | H | H | $CH_2CH_3$ | $CH_2CH_3$ |
| 5 | $NH_2$ | H | Cl | H | $CH_2CH_3$ | $(CH_2)_2CH_3$ |
| 6 | $NH_2$ | H | Cl | $CH_3$ | $CH_2CH_3$ | $(CH_2)_2CH_3$ |
| 7 | $NH_2$ | H | Cl | $CH_2$-phenyl | $CH_2CH_3$ | $(CH_2)_2CH_3$ |
| 8 | $NH_2$ | H | Cl | H | phenyl | $(CH_2)_2CH_3$ |
| 9 | $NH_2$ | H | $CH_3$ | H | $(CH_2)_2OCH_3$ | $(CH_2)_2CH_3$ |
| 10 | $NH_2$ | $CH_3$ | H | H | $(CH_2)_2OCH_3$ | $(CH_2)_2CH_3$ |
| 11 | $NH_2$ | H | H | H | $(CHCH_2)CH_2$ | |
| 12 | $NH_2$ | $CH_3$ | H | H | $(CHCH_2)CH_2$ | |
| 13 | $NH_2$ | H | H | H | $(CH_2)_3CH_3$ | $(CH_2)_3CH_3$ |
| 14 | $NH_2$ | H | Cl | H | $(CH_2)_3CH_3$ | $(CH_2)_3CH_3$ |
| 15 | $NH_2$ | $CH_3$ | H | H | $(CH_2)_3CH_3$ | $(CH_2)_3CH_3$ |
| 16 | $NH_2$ | $CH_3$ | H | Cl | $(CH_2)_3CH_3$ | $(CH_2)_3CH_3$ |
| 17 | Cl | H | H | H | $(CH_2)_3CH_3$ | $(CH_2)_3CH_3$ |
| 18 | Br | H | H | H | $(CH_2)_3CH_3$ | $(CH_2)_3CH_3$ |
| 19 | $CH_3$ | H | H | H | $(CH_2)_3CH_3$ | $(CH_2)_3CH_3$ |
| 20 | $NH_2$ | H | H | H | $(CH_2)_3CH_3$ | H |

General preparation of the dyes of Table 1 is illustrated by the following single step preparation of the nickel complex of 2-amino-3-hydroxy-6-(2-N,N dipropylcarbamoylphenylazo) pyridine (dye 2 of Table 1, infra).

Nickel acetate (12.4 g) was added to dimethylformamide (280 mL) followed by 2-amino-N,N-dipropylbenzamide (22 g) and 2-amino-3-hydroxypyridine (11 g). Acetic acid (280 mL) was added and the mixture was stirred for 40 minutes at room temperature. The temperature was then lowered to ca. 5° C. and a solution of sodium nitrite (7.2 g in 20 mL of water) was added slowly over a period of 15 minutes. After 2 hours, sodium acetate (55 g) was added and after stirring for 20 minutes the mixture was poured into ice water (3 L). The complex was filtered off and washed with water. The crude product was dissolved in boiling 2-butanone (1 L) and filtered hot. The filtrate was concentrated to 400 mL and cooled. The product dye 2 was filtered off and dried at 50° C. in the vacuum oven. The yield was 20.5 g (52%). $\lambda max=531$ nm $\epsilon=9.1\times10^4$.

The indices of some metallized carbamoylazo dyes of Table 1 are listed in Table 2 below.

A portion of the representative cyanine dyes that are useful are presented in Table 2:

TABLE 2

Cyanine Dyes

| Cyanine Dye | Structure |
|---|---|
| A | [Structure: bis-benzindolium pentamethine cyanine dye with N-butyl groups and $ClO_4^-$ counterion] |

TABLE 2-continued

Cyanine Dyes

| Cyanine Dye | Structure |
|---|---|
| B | (structure with two naphthalene-fused indolium groups, butyl and hydroxyethyl N-substituents, ClO$_4^-$ counterion) |
| C | (structure with two naphthalene-fused indolium groups, butyl and hydroxyethyl N-substituents, BF$_4^-$ counterion) |
| D | (structure with two naphthalene-fused indolium groups, butyl and methyl N-substituents, ClO$_4^-$ counterion) |
| E | (structure with naphthalene-fused indolium and indolium groups, butyl and methyl N-substituents, BF$_4^-$ counterion) |
| F | (structure with naphthalene-fused indolium and indolium groups, butyl and hydroxyethyl N-substituents, BF$_4^-$ counterion) |
| G | (structure with naphthalene-fused indolium and indolium groups, butyl and hydroxyethyl N-substituents, ClO$_4^-$ counterion) |
| H | (structure with naphthalene-fused indolium and indolium groups, butyl and methyl N-substituents, BF$_4^-$ counterion) |
| I | (structure with naphthalene-fused indolium and indolium groups, butyl and methyl N-substituents, ClO$_4^-$ counterion) |
| J | (structure with two naphthalene-fused indolium groups, butyl and methyl N-substituents, ClO$_4^-$ counterion) |
| K | (structure with two naphthalene-fused indolium groups, two propyl N-substituents, ClO$_4^-$ counterion) |
| L | (benzothiazole cyanine dye with two propyl N-substituents, ClO$_4^-$ counterion) |
| M | (benzothiazole cyanine dye with two hydroxyethyl N-substituents, Br$^-$ counterion) |

TABLE 2-continued

Cyanine Dyes

| Cyanine Dye | Structure |
|---|---|
| N | (structure with NO$_2$, CH$_3$OSO$_3^-$) |
| O | (benzothiazole structure with ClO$_4^-$, OH) |
| P | (benzothiazole structure with I$^-$, Cl) |
| Q | (structure with NO$_2$ groups, Br$^-$, OH, HO) |
| R | (benzimidazole structure with Cl$^-$) |
| S | (structure with CF$_3$SO$_3^-$) |
| T | (structure with ClO$_4^-$) |
| U | (structure with BF$_4^-$) |
| V | (structure with ClO$_4^-$) |
| W | (structure with ClO$_4^-$) |
| X | (benzoxazole structure with ClO$_4^-$) |

Several different layer configurations are possible for these DVD optical recording elements. Two different configurations are included in FIGS. 1 and 2.

In FIG. 1, the DVD element can comprise the following layer arrangement:

(a) a transparent grooved substrate (1) having a groove width of from 100 to 800 nm; a groove depth of 30 to 270 nm; and a groove pitch of 0.5 to 1.8 μm. usually 0.8 μm or below.

(b) an optical recording layer (2) comprising a metallized carbamoylazo dye having an azo group ling a substituted 3-hydroxypyridine nucleus to a phenyl nucleus wherein the phenyl nucleus has a carbamoyl substituent ortho to the azo group wherein the recording layer. The unrecorded recording layer has a refractive index, at a selected wavelength from 645 to 655 nm, comprising a real part (n) greater than 1.8 and an imaginary part (k) less than 0.2.

(c) a light reflecting layer (3).

(d) a protective layer (4).

(e) an adhesive layer (5).

(f) a protective layer (6).

(g) a reflective layer (7).

(h) a substrate (8).

In the above configuration one or more of layers (d), (f) and (g) may be omitted.

Figure 2:
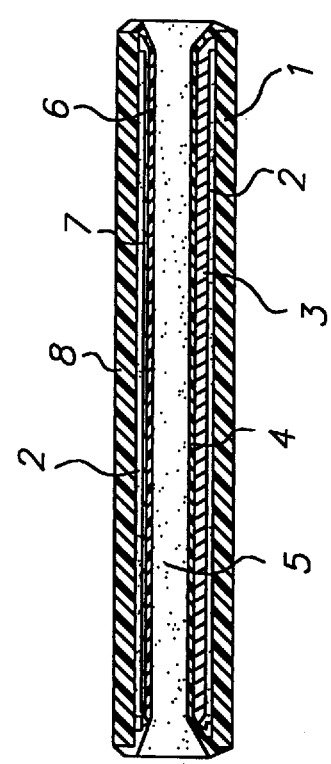
FIG. 2 presents a DVD optical recording element having two optical recording layers.

In a configuration of FIG. 2 the DVD element can comprise the following layer arrangement:

(a) a transparent grooved substrate (1) having a groove width of from 100 to 800 nm; a groove depth of 30 to 270 nm; and a groove pitch of 0.5 to 1.8 μm, usually 0.8 μm or below.

(b) an optical recording layer (2) comprising a metallized carbamoylazo dye having an azo group linking a substituted 3-hydroxypyridine nucleus to a phenyl nucleus wherein the phenyl nucleus has a carbamoyl substituent ortho to the azo group the recording layer. The unrecorded recording layer has a refractive index, at a selected wavelength from 645 to 655 nm, comprising a real part (n) greater than 1.8 and an imaginary part (k) less than 0.2.

(c) a light reflecting layer (3).

(d) a protective layer (4).

(e) an adhesive layer (5).

(f) a protective layer (6).

(g) a reflective layer (7).

(h) an optical recording layer (2) comprising a metallized carbamoylazo dye having an azo group linking a substituted 3-hydroxypyridine nucleus to a phenyl nucleus wherein the phenyl nucleus has a carbamoyl substituent ortho to the azo group. The unrecorded recording layer has a refractive index ,at a selected wavelength from 645 to 655 nm, comprising a real part (n) greater than 1.8 and an imaginary part (k) less than 0.2.

(i) a transparent grooved substrate (8) having a groove width of from 100 to 800 nm; a groove depth of 30 to 270 nm; and a groove pitch of 0.5 to 1.8 μm, usually 0.8 μm or below.

In some of the above embodiments one or both of the protective layers (d) and (f) may be omitted.

The substrate may be any transparent material that satisfies the mechanical and optical requirements. The substrates for the above embodiments are generally pregrooved with groove depths from 20 nm to 250 nm, groove widths 0.2 to 1 mm and a pitch 0.5 to 2 mm particularly for CD-R. For DVD-R elements substrates the required groove specifications are mentioned in the description of FIGS. 1 and 2 above. The preferred material is polycarbonate, other materials are glass, polymethylmethacrylate and other suitable polymeric materials.

The preparation of the optical recording elements having dye recording layers is achieved by spin coating of the dye mixture, with or without addenda, from a suitable solvent onto a transparent substrate. For coating, the dye mixture, with or without addenda, is dissolved in a suitable solvent such that the dye is 20 or less parts by weight to 100 parts of solvent by volume. The dye recording layer is then overcoated with a metal reflective layer under reduced pressure by resistive heating or a sputter method and finally overcastted with a protective resin.

Coating solvents for the dye recording layer are selected to minimize their effect on the substrate. Useful solvents include alcohols, hydrocarbon halides, cellosolves, ketones. Examples of solvents are 2,2,3,3-tetrafluoropropanol, tetrachloroethane, dichloromethane, methyl cellosolve, ethyl cellosolve, 1-methoxy-2-propanol, 4-hydroxy-4-methyl-2-pentanone. Preferred solvents are alcohols since they have the least effect on the preferred polycarbonate substrates. Mixtures containing these solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum, copper and alloys thereof.

The protective layer over the reflective layer is similarly conventional for this art. Useful materials include UV curable acrylates.

An intermediate layer, to protect the metal layer from oxidation, can also be present.

In DVD elements the adhesives can be applied using screen printing, hot roller and spin coating methods. The application described herein spin coating and spin lamination. The protective layer containing the accelerator is spin coated and the cyanoacrylate adhesive is spin laminated. Spin lamination takes place by dispensing a circular bead near the inside diameter of the protective layer of the first assembly. The latter assembly is placed on a spin coating machine. The second assembly is placed on top of the first assembly forming a laminate. The laminate is rotated at a high speed, spreading the adhesive evenly between the two assemblies.

The following examples further clarify the invention.

EXAMPLE 1

A DVD type optical recording element comprising first and second assemblies were prepared as follows.

First assembly: A polycarbonate disc substrate having a thickness of 0.6 mm, an outer diameter of 120 mm and an inner diameter of 15 mm with a spiral groove on its surface with a width of 300 nm and a depth of 140 nm and a pitch of 0.8 μm, was made by injection molding.

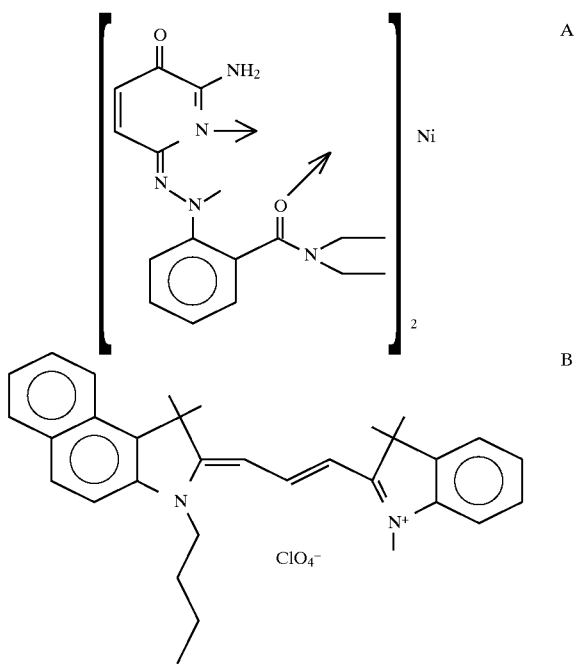

To form the recording layer a mixture of 1 part by weight of cyanine dye B and 1 parts by weight of stabilizer A was dissolved with ultrasound at room temperature in 1 hour in 100 parts by volume of 2,2,3,3-tetrafluoropropanol. Then the solution was filtered through a 0.2 μm filter. The solution was coated on the surface of the substrate by spin coating to an overall optical density of 0.70 at 526 nm. It was dried at 60° C. for 30 minutes.

Then a gold reflective layer was deposited on the recording layer by thermal evaporation process using Veeco Thin Film Vacuum Coater to a thickness of 120 nm at 1100° C. between $10^{-5}$ to $5\times10^{-5}$ Torr pressure at a rate of 1nm/second.

A polymeric protective layer was prepared by mixing 75 parts by weight trimethylol propane ethoxylate triacrylate, 15 parts by weight 2-(dimethylamino)ethyl acrylate (cyanoacrylate adhesive accelerator) and 10 parts by weight, 2-hydroxy-2-methyl propiophenone. All these components were obtained from Aldich chemical. This solution was applied on to the gold surface by discharging 2 cc of solution near the inside diameter while the disk was spinning at 100 RPM. This spinning resulted in spreading the solution over the entire surface. The spin speed was increased to 2000 RPM and maintained for 10 seconds. To cure the solution, the disk was exposed to ultraviolet light using a model F300-6 ultraviolet curing system from Fusion UV Curing Systems equipped with a medium pressure mercury H bulb at a dosage of 1.1 J/cm².

Second assembly: A gold reflective layer was also deposited on plain polycarbonate substrate under the same condition described above. A protective layer according to the first assembly was deposited on the gold reflective layer.

The first and second assembly were laminated together by applying 2 mL of adhesive near the inside diameter of the protective layer in the first assembly.

The adhesive used was a high viscosity formulation of 2-ethyl-2-cyanoacrylate supplied by the Henkel Adhesive Corporation (Sicomet 8400). The first assembly was bonded to the second assembly through the protective layer of the first assembly and the substrate of the second assembly. The combined assembly is then spun at a speed of 4000 RPM for 1 second to uniformly distribute the adhesive and eliminate any air bubbles. Within 5 seconds, the assembled DVD optical element was cured to a level allowing handling.

The complete laminated assembly had the layer configuration shown in FIG. 1.

To test the optical disc, a test system consisting of an optical head with a 635 nm laser, a 0.6 NA lens, push-pull tracking, and a ½ aperture focusing was used. The optics used circularly polarized light to reduce laser feedback effects. Recording and play back were carried out with the same laser at 3.84 m/s rotational speed. The read power was kept at 0.5 mW. Single frequency marks were recorded with a 1.61 micron mark length at 10 mW write power thereby forming marks of lower reflectivity than the unmarked area when examined with light source emitting at 635 nm light. When the marks were read with the read laser, through 30 KHz filter centered at the mark carrier frequency, for this recording layer a CNR (carrier to noise ratio) of 50 dB was obtained.

This example shows that DVD elements containing cyanoacryate adhesives are operative as optical recording elements.

EXAMPLE 2

In this example a DVD element was prepared having two assemblies that were the same as the first assembly in example 1 was prepared. The two assemblies were laminated together through their respective protective layer to protective layers according to the procedure described in example 1. The resulting DVD optical element comprised recordable sides A and B. Side A had an optical density at the 41 mm write radius of 0.70 and side B also at 41 mm write radius of 0.68. When writing on side A with 10 mW write power at 635 nm a 47 dB CNR was obtained on reading the marks, by the method described above, and on side B with 10 mW write power 50 dB CNR was obtained.

EXAMPLE 3

This examples shows the cyanoacrylate cure rates with and without the cyanoacrylate accelerator incorporated into the protective layers.

A polycarbonate disc substrate having a thickness of 0.6 mm, an outer diameter of 120 mm and an inner diameter of 15 mm with a spiral groove on its surface with a width of 300 nm and a depth of 140 nm and a pitch of 0.8 $\mu$m, was made by injection molding.

Two different protective layers were prepared on disks of polycarbonate substrate.

Protective layer A:

75 parts by weight trimethylol propane ethoxylate triacrylate; 15 parts by weight 2 (dimethylamino)ethyl acrylate (accelerator); 10 parts by weight, 2-hydroxy-2-methyl propiophenone Protective layer B:

90 parts by weight trimethylol propane ethoxylate triacrylate; 10 parts by weight 2-hydroxy-2-methyl propiophenone.

Protective layers of each composition were formed on separate polycarbonate disk substrates by discharging 2 mL of the protective layer coating composition near the inside diameter of the disk while the disk was spinning at 100 RPM. This spinning spread the solution over the entire disk surface. The spin speed was increased to 2000 RPM and maintained for 10 seconds. The protective layers were cured by exposure to ultraviolet light using a model F300-6 ultraviolet curing system from Fusion UV Curing Systems equipped with a medium pressure mercury H bulb at a dosage of 1.1 J/cm². Two mL of 2-ethyl-2-cyanoacrylate adhesive was applied in a ring near the inside diameter of the protective layer. A second polycarbonate disk coated with a similar protective layer was placed over the protective layer thereby forming a laminate. The laminate was spun at a speed of 4000 RPM for 1 second.

Cure time of the adhesive in each laminate was determined by introducing air bubbles into the cyanoacrylate adhesive prior to application of the protective layer. This creates air bubbles in the adhesive layer. The bubbles are used to determine cure time. Application of pressure to the laminates will cause the bubbles to move until the adhesive fully cures. Cure times are presented below

TABLE 3

| Solidification times for cyanoacrylate adhesives | |
|---|---|
| | Cure Time |
| Protective Layer A | 30 seconds |
| Protective Layer A | 3 days |

This examples shows the effectiveness of including the accelerator in the protective layer.

The invention has been described in detail with particular reference to certain preferred embodiments thereof, but it will be understood that variations and modifications can be effected within the spirit and scope of the invention.

What is claimed is:

1. A DVD optical recording element having the following layer arrangement:
   (a) a transparent substrate;
   (b) an optical recording layer;
   (c) a light reflecting layer;
   (d) a polymeric protective layer one or more vinyl monomers, including at least one vinyl monomer having incorporated therein an amine group that accelerates curing of cyanoacrylate adhesives.

(e) a cured cyanoacrylate adhesive; and (f) a substrate.

2. The element of claim 1 also comprising a protective layer between layers (e) and (f).

3. The element of claim 2 also comprising a reflective layer adjacent to layer (f).

4. The element of claim 1, having, between layers (e) and (f), the following additional layers in the recited order:

a protective layer;

a reflective layer;

an optical recording layer and a transparent substrate.

5. The element of claim 1, having, between layers (e) and (f), the following additional layers in the recited order:

a protective layer;

an optical recording layer; and a reflective layer.

6. The element of claim 5 wherein the protective layer between layers (e) and (f) also includes a accelerator for cyanoacrylate adhesives.

7. An element according to any one of claims 1-6 wherein the optical recording layer is a dye layer, a phase change layer or low absorption material layer.

8. A method of making a DVD optical recording comprising the steps of:

providing a first assembly comprising:

(a) a transparent substrate;

(b) an optical recording layer over the grooved substrate;

(c) a light reflecting layer over the recording layer and (d) a protective layer over the light reflective layer; wherein the protective layer includes a accelerator that accelerates curing of cyanoacrylate adhesives;

providing a second assembly comprising at least a substrate;

forming a laminate of the first and second assembly by bonding, with a cyanoacrylate adhesive, the protective layer of the first assembly to (i) the substrate of the second assembly or (ii) another exposed layer of the second assembly.

9. The method of claim 8 wherein the support of the second assembly bears a protective layer and the protective layer of the first assembly is bonded to the protective layer of the second assembly.

10. The method of claim 8 wherein the second assembly has the same layer coniguration as the first assembly and the two assemblies are bonded to each other with a cyanoaclylate adhesive through their respective protective layers.

11. The method of claim 8 wherein the second assembly comprises a support bearing, in the following order, a reflecting layer, an optical recording layer and a protective layer.

12. The method of claim 8 wherein the cyanoacrylate adhesive is derived from a cyanoacrylate ester having the structure:

$CH_2$=$C(CN)(COOR)$ wherein R represents —$CH_3$, —$(CH_2)_nCH_3$ wherein n=1-3, —$OCH_2CH_2OCH_3$, —$OCH_2CH_2OCH_2CH_3$, —$CH(CH_3)_2$, and —$CH(CH_2,CH_3)(CH_3)$.

13. The method of claim 8, 9, 10 or 11 wherein the cyanoacrylate is selected from the group consisting of methyl 2-cyanoacrylate, ethyl 2-cyanoacrylate, isopropyl, 2-cyanoacrylate, butyl 2-cyanoacrylate, isobutyl 2-cyanoacrylate, methoxy ethyl 2-cyanoacrylate and ethoxy ethyl 2-cyanoacrylate.

14. The method of claim 8, 9, 10 or 11 wherein the protective layer is a photopolymerized composition of one or more vinyl monomers, including at least one vinyl monomer having incorporated therein an amine group that accelerates curing of cyanoacrylate adhesives.

\* \* \* \* \*